INVENTORS
RAYMOND F. DURHAM
JOHN R. SCHREINER
BY
*Herman Seid*
ATTORNEY.

Aug. 10, 1965  R. F. DURHAM ETAL  3,199,846
APPARATUS FOR PURIFYING AND CONTROLLING
THE RELATIVE HUMIDITY OF AIR
Filed July 5, 1960  2 Sheets-Sheet 2

INVENTOR.
RAYMOND F. DURHAM
JOHN R. SCHREINER
BY *Herman Seid*

ATTORNEY.

3,199,846
APPARATUS FOR PURIFYING AND CONTROL-
LING THE RELATIVE HUMIDITY OF AIR
Raymond F. Durham and John R. Schreiner, Liverpool,
N.Y., assignors to Carrier Corporation, Syracuse, N.Y.,
a corporation of Delaware
Filed July 5, 1960, Ser. No. 40,865
2 Claims. (Cl. 261—3)

This invention relates generally to air treatment and more particularly to the purification of air and to the control of the relative humidity of the air throughout the year.

In the air treatment of any given area one of the desiderata is the provision of pure air relatively free of odors and foreign material. This may be accomplished by filtration of the air in the conditioned area. A variety of filtration means have been evolved, which serve to eliminate foreign matter, and odors from the air. These filtration means employ screens, liquid baths, sprays, and the like. However, these conventional filtration means require periodic replacement of the filter elements, which become ineffective due to clogging by the filtration means. With a view to eliminating the need for periodic replacement, self-cleaning filter structures have been developed. There are a variety of types employed: mechanical, fluid, chemical, and a combination of these types. An effective air purifying means which has been evolved employs triethylene glycol or diethylene gylcol in combination with a mechanical filter, such as a screen, through which the conditioned air stream is passed. The surface tension of the triethylene glycol or diethylene glycol serves to cause any foreign particles in the air stream to adhere thereto and serves further to absorb most foul odors in the air. The glycol is thereafter passed through a desorbing chamber where it is cleaned for re-use. Effective distribution of the glycol over the mechanical filter, and effective desorption of the foreign odors from the glycol presents a variety of problems.

Another desiderata in the air treatment of a given area is the provision of air at a desirable relative humidity. Humidification is usually accomplished by evaporating water from an evaporative surface extending from a pan located in the bonnet of a furnace. The intermittent flow of water to the pan is often controlled by a float valve. It has been found that the addition of water, especially hard water containing dissolved solids, such as, for example, calcium carbonate and magnesium carbonate creates a problem in that the dissolved solids may tend to adhere to the evaporative surface in the pan and clog the same. Similarly, it has been found that the surface of the mechanical filter tends to clog and eventually interferes with the flow of air through the filter.

It is with these problems in mind that the present invention has been evolved, means providing for purification of the air and means providing for regulation of the humidity of the air within a prescribed desirable range.

A primary object of this invention is to provide improved air treating means in which the disadvantages of prior air treating means is obviated.

An object of the invention is to provide improved air purifying and odor absorbing means for use in air conditioning.

Another object of the invention is to provide air treating apparatus having improved means for controlling the humidity of the air passing through the apparatus.

These and other objects of the invention which will become hereinafter more apparent are attained by provision of novel air treating means particularly adapted for use in an air conditioning system designed to bring air of desired properties to a conditioned area. The air treating means comprises a casing within which is mounted a filter member arranged with one end higher than the other. A tiltably mounted dump trough is arranged over the higher end of the filter member. The trough is designed to receive and hold a fluid treating medium such as triethylene glycol. A sump is disposed beneath the filter member to catch the fluid treating medium draining therefrom and a pump with an appropriate conduit directs fluid from the sump to the trough. When the trough has been filled to a predetermined level it tilts to distribute fluid uniformly over the filter member. A regenerator assembly is disposed in the casing and a bypass line conducts a portion of the fluid distributed from the trough to a collection pan in the regenerator assembly. A blower pumps air into the collection pan to agitate the fluid in the pan and to drive off any desorbed odors. A heater is disposed beneath the pan to precipitate solids dissolved in the fluid air treating medium. These precipitated solids as well as the regenerated medium overflow the collection pan and are returned to the sump. Means may be provided in the sump to separate the precipitated solids from the medium contained in the sump.

An important feature of the invention resides in the arrangement of the blower providing an air stream serving to agitate and aerate the fluid in the regenerator assembly.

Another feature of the invention resides in the heating of a portion of the air treating fluid in a collection pan in the regenerator assembly to cause solids dissolved in the medium to form in the collection pan rather than to remain in the air treating medium and adhere to and clog the surface of the filter member.

An additional feature of the invention resides in the novel water supply arrangement and the dual control provided by a solenoid valve energized in response to a humidistat and a float valve operative in response to the level of liquid in the sump.

The specific structural details of the invention and their mode of operation will be made most manifest and clearly pointed out in full, concise, and exact terms in conjunction with the accompanying drawings wherein.

Figure 1:
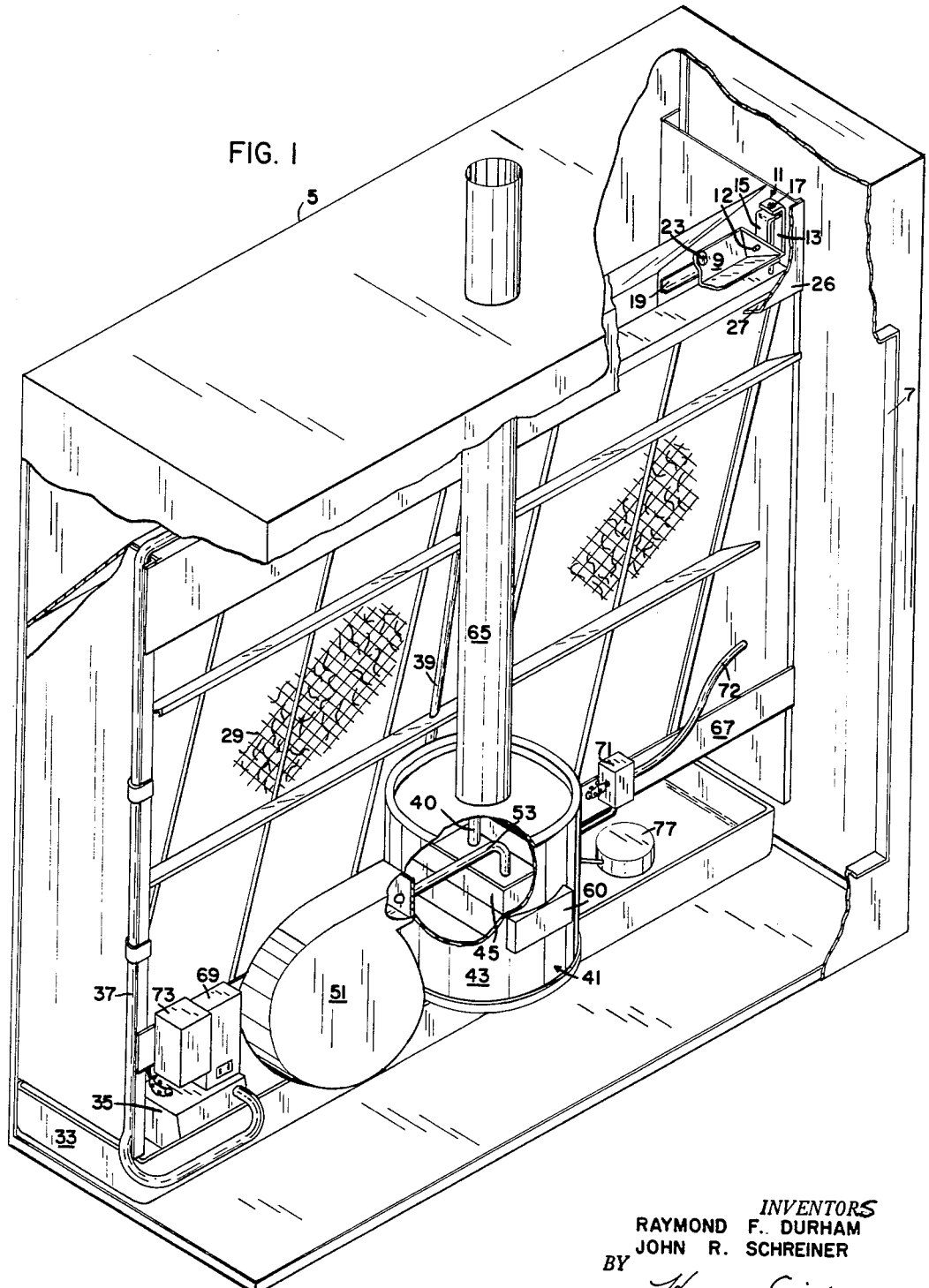
FIGURE 1 is a perspective view of an embodiment of the present invention with parts broken away to more clearly reveal the structural details thereof.

Referring now more particularly to the drawings, like numerals in the various figures will be taken to designate like parts. As best seen in FIGURE 1, the novel air treating apparatus comprises a casing 5 formed of sheet metal or the like. The casing has an inlet 7, preferably, in the front of the casing and an outlet 8 in the rear of the casing. The casing is adapted to be arranged in the duct work of an air conditioning system. It is preferred that the fan means within the air conditioning system moves air through the casing to be treated and then to the area to be conditioned.

A dump trough 9 formed of sheet metal or plastic is pivotally mounted on adjustable brackets 11 within casing 5 by means of pivot pins 12 extending from each end of the trough 9.

Each adjustable bracket is comprised of a first channel member 13 secured to a side wall of the casing and a second channel member 15 in which the pivot pins 12 are journalled. An adjusting screw 17 is disposed in threaded openings in the first and second channel members. By rotating the screw 17, the trough 9 may be leveled with respect to a horizontal plane. A suitable limit stop 19 is affixed to the casing to maintain the trough 9 in normal position to receive a supply of fluid air treating medium.

In cross section the trough 9 is formed in the shape of a scalene triangle having a long leg 20 and a short leg 21. Upon the short leg 21 is mounted a counterweight 23 to urge the trough in a counterclockwise direction.

Figure 2:
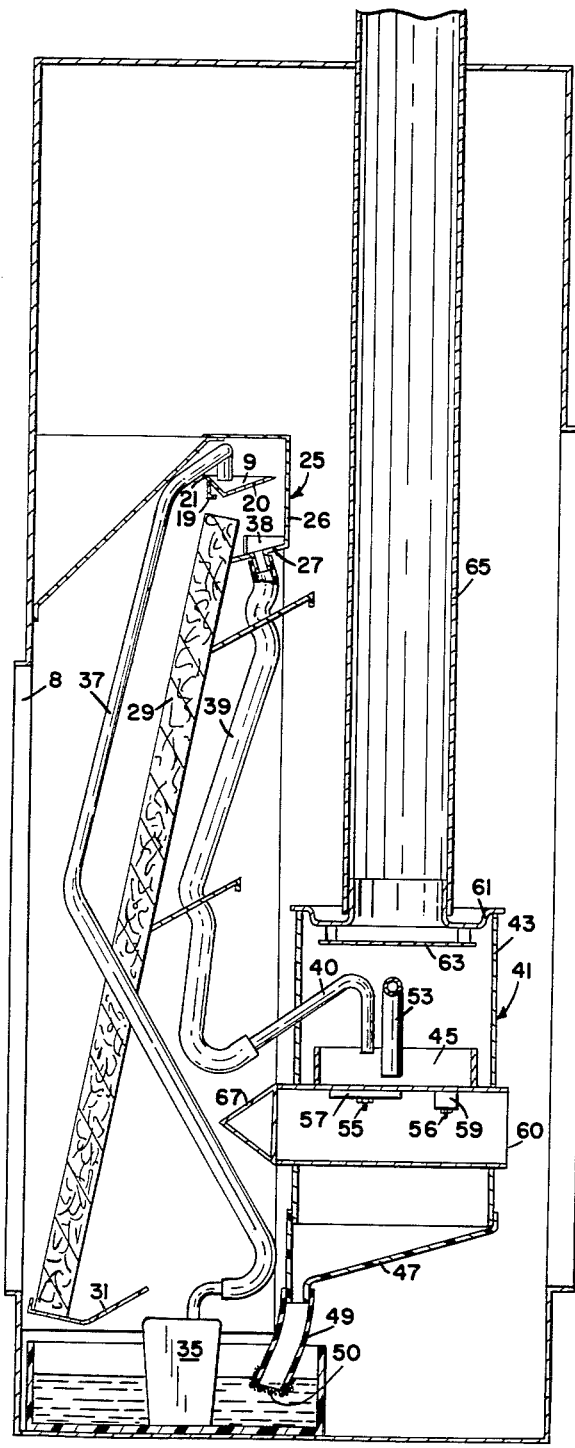
FIGURE 2 is a transverse sectional view of the embodiment of the invention illustrated in FIGURE 1.

When the trough is filled with a predetermined quantity of fluid air treating medium, it tilts in the clockwise direction as viewed in FIGURES 1 and 2 and delivers its contents upon the downwardly inclined baffle 27 of the trough cover assembly 25. The trough cover assembly is comprised of a vertically extending member 26 and a downwardly inclined baffle 27.

The air treating medium discharged from the baffle flows down a filter 29, which is preferably formed of layers of expanded metal, mounted angularly within casing 5 at approximately 75° with the horizontal. The filter is removably supported on brackets 31 affixed to the sidewalls of casing 5. Liquid flows down the filter in intimate contact with the air passing therethrough and is collected in sump 33.

Disposed within plastic sump 33 is a pump 35 for drawing liquid from the sump and forcing it through line 37 to dump trough 9.

A portion of the liquid discharged upon the trough cover assembly collects in well 38 and flows through line 39 and tube 40 to regenerator assembly 41. The regenerator assembly comprises a housing 43 having disposed therein a collection pan 45. Liquid is discharged into collection pan 45 from line 39 and tube 40 and overflows into funnel 47 from which it flows through line 49 back to the sump.

A blower 51 preferably of the squirrel cage type is disposed adjacent the regenerator assembly. Blower 51 directs air through line 53 which extends into collection pan 45 below the surface of the liquid contained therein.

Depending from collection pan 45 is a pair of spaced studs 55 and 56. On stud 55 is suitably mounted a heater 57 and upon stud 56 is mounted a thermostat 59. A plate 60 is removably mounted on housing 43 to provide access to the heater and thermostat for maintenance.

To the cover 61 of regenerator assembly 41 is affixed a splash plate 63 to confine splashing air treating medium within the regenerator housing 43. Extending upwardly from cover 61 is exhaust flue or duct 65.

It is noted that the regenerator assembly and blower are affixed adjacent to one another on transverse support member 67. Also affixed on member 67 is a humidistat 69 which senses the need for additional water to properly humidify the air and functions in concert with solenoid valve 71 to control the addition of water to the sump. The valve 71 is connected by means of line 72 to a suitable source of water.

The electrical connections from each of the components extend through the transverse support member 67 and collect within conduit portion 73.

A valve 75 cooperates with solenoid valve 71 to maintain a predetermined level in the sump and to prevent overflowing of the sump. The float 77 is fixed to float arm 79 which is adjustably connected to an elbow 81 pivoted to valve 75 at 82. A set screw 83 extends through elbow 81 and engages float arm 79. The float arm is fastened to the elbow by means of wing nut 85.

Figure 3:
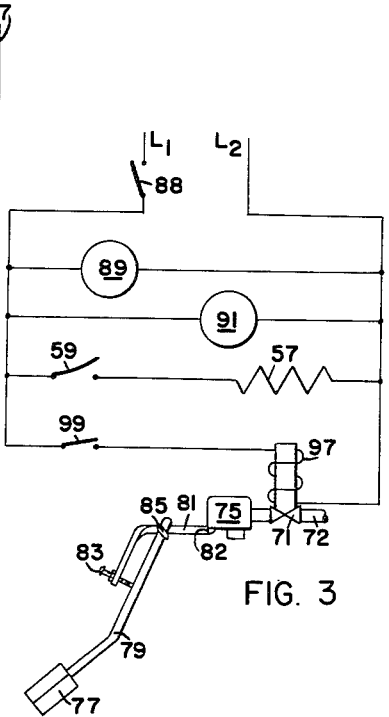
FIGURE 3 is a wiring schematic of the electrical system of the present invention also illustrating the water supply control mechanism.

Referring now to FIGURE 3, the lead lines $L_1$ and $L_2$ are connected to a suitable source of current. A suitable switch 88 controls the flow of current to the components of the electrical system. The pump motor 89 is connected in series with the lead line $L_1$ and $L_2$. Blower motor 91 is connected in parallel with pump motor 89. The regenerator heater 57 and the thermostat 59 are connected in series with one another and are together disposed in parallel to the pump motor and blower motor. Solenoid 97 of valve 71 is connected in series with switch 99 of humidistat 69.

The air treating means above disclosed is intended for use in conjunction with an air conditioning system, the air treating means being arranged in the duct work of the air conditioning system so that the air stream passing through casing 5 will be purified and cleaned. In addition, the relative humidity of the air will be appropriately regulated within a prescribed control range. The filter 29 is arranged transversely to the air stream and at an angle with the vertical. The air treating medium is discharged upon the upstream surface of the filter 29. By virtue of the orientation of the filter with respect to the air stream the tendency for fine particles of the air treating medium to work through the filter and be carried in the air stream into the area to be treated is eliminated.

In operation, switch 88 is closed energizing pump motor 89 and blower motor 91. The pump 35 draws the fluid air treating medium, a special blend of triethylene glycol, up from sump 33 through supply line 37. The fluid is discharged into dump trough 9. When the trough 9 has been filled by the triethylene glycol to a desired level, the weight of the fluid acting against the longer leg 20 causes the trough 9 to pivot about pivot pins 12 discharging the fluid onto baffle 27, whence the fluid discharges over filter 29. Counterweight 23 serves to return trough 9 to the fluid medium receiving position shown in FIGURES 1 and 2. A portion of the fluid medium discharged by trough 9 is bypassed through line 39 and tube 40 to regenerator assembly 41. The bypassed fluid medium is collected in pan 45. The heater 57 is provided to assist in the regeneration process and in addition to precipitate dissolved carbonates and other minerals from the air treating medium. A regenerating air stream from blower 51 is passed through line 53 to agitate and aerate the fluid in the collection pan 45 to aid in effecting the desorbing of the odors from said fluid and the discharge of the precipitated solids from the collection pan. The desorbed odors pass off from the casing through the exhaust duct 65. The regenerated medium and the precipitated solids therein overflow the collection pan and flow through funnel 47 and line 49 back to the sump. A screen trap 59 may be removably disposed about the terminal end of line 49 to collect and separate the dissolved solids from the regenerated medium.

In the event the humidistat senses a need for additional water to maintain a desired relative humidity, switch 99 is automatically closed and the solenoid 97 is energized to open valve 71 and permit the flow of water through line 72. Assuming that the level of medium in the sump is down because of evaporation into the air stream, additional water will flow into the sump. The water will continue to flow through line 72 until the humidistat is satisfied at which time solenoid 97 is deenergized and valve 71 is closed or until the proper level is attained in the sump at which time valve 75 will be closed preventing further discharge of water.

It is thus seen that a novel air treating arrangement has been provided having a novel mode of functioning, whereby air may be purified by passing the same through a filtering means including a filter and a fluid filtration system and also whereby the humidity of the air passing to an area to be conditioned may be regulated. The intermittent flushing serves to clean the filter and maintain continuous operation of the air treating apparatus with a minimum of maintenance. The water supply system is under the control of a humidistat, a solenoid valve and a float controlled valve. To compensate for possible clogging of the filter by the concentration of carbonate normally found in hard water, we have provided a heater in heat exchange relation with the collection pan in the regenerator assembly. The carbonates precipitate at the highest temperature i.e., within the collection pan, overflow the collection pan and are collected in a suitable trap.

In this manner the filter is maintained clean and free from dirt and other foreign matter.

The above disclosure has been given by way of illustration and not by way of limitation and it is desired to protect all the embodiments of the herein disclosed invention within the scope of the appended claims.

We claim:

1. An air treating apparatus comprising a contact surface adapted to be wetted by a liquid air treating solution and arranged for contact with the air to be treated; a sump beneath the contact surface containing the liquid air treating solution; means for discharging solution from said sump over said contact surface; a bypass line directing a portion of the solution from the contact surface; a regenerator; receiving means within the regenerator for receiving the bypass solution; means for heating the solution in said receiving means for precipitating solids therefrom; a blower; a conduit leading air from said blower into the solution in said receiving means to remove the odorous vapors therefrom and to cause the solids to overflow the receiving means; a duct for passing off vaporous odors released during regeneration; and a return line from the regenerator to the sump, returning the regenerated solution and precipitated solids thereto, and means for adding water to the solution in said sump in response to the humidity of the purified air including a conduit adapted to be connected to a source of water, a solenoid valve in said conduit, control means for said solenoid adapted at a predetermined relative humidity of the air to actuate said solenoid and admit water to said sump, and means responsive to the level of solution in said sump to limit flow of water through said conduit thereby to limit the dilution of the solution and prevent overflowing of the sump.

2. An air treating apparatus as in claim 1 in which said solution level responsive means comprises a float control valve in said conduit downstream of said solenoid valve.

References Cited by the Examiner

UNITED STATES PATENTS

| | | | |
|---|---|---|---|
| 1,527,586 | 2/25 | Hurziker | 55—43 |
| 1,895,618 | 1/33 | Fedeler | 55—228 |
| 2,095,386 | 10/37 | Hibberd | 261—3 |
| 2,108,248 | 2/38 | Bichowsky | 55—89 |
| 2,147,248 | 2/39 | Fliesher | 55—32 |
| 2,235,322 | 3/41 | Martin. | |
| 2,239,190 | 4/41 | Chambers | 62—34 |
| 2,428,643 | 10/47 | Young. | |
| 2,502,137 | 3/50 | Fleisher | 261—106 |
| 2,583,252 | 1/52 | Carraway | 55—228 |
| 2,793,015 | 5/57 | Thompson | 55—257 |
| 2,852,090 | 9/58 | Kelly. | |
| 3,105,749 | 10/63 | Gebert et al. | 55—48 |

FOREIGN PATENTS

| | | |
|---|---|---|
| 798,529 | 3/36 | France. |
| 820,697 | 9/59 | Great Britain. |

HARRY B. THORNTON, *Primary Examiner.*

WALTER BERLOWITZ, HERBERT L. MARTIN, *Examiners.*